No. 661,965. Patented Nov. 20, 1900.
K. A. ENLIND.
NON-SLIPPING RUBBER TIRE.
(Application filed Feb. 19, 1900.)
(No Model.)
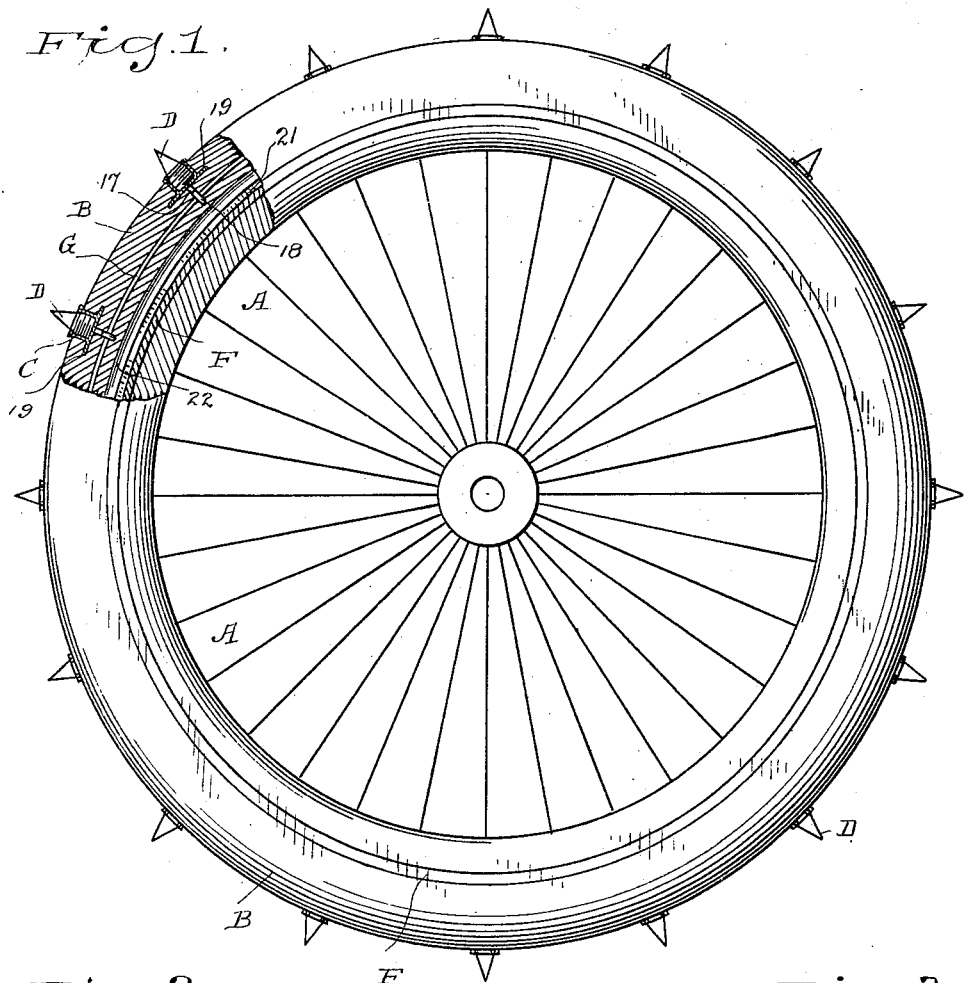
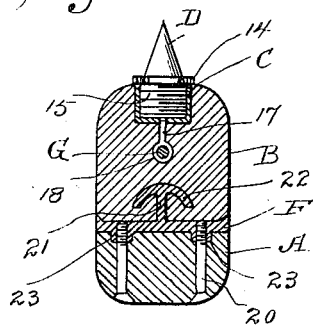
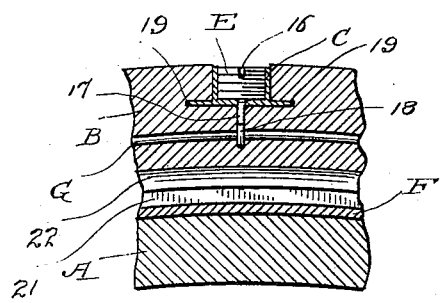
WITNESSES
INVENTOR
Knute Arvid Enlind

UNITED STATES PATENT OFFICE.

KANUTE ARVID ENLIND, OF NAUGATUCK, CONNECTICUT.

NON-SLIPPING RUBBER TIRE.

SPECIFICATION forming part of Letters Patent No. 661,965, dated November 20, 1900.

Application filed February 19, 1900. Serial No. 5,677. (No model.)

*To all whom it may concern:*

Be it known that I, KANUTE ARVID ENLIND, a citizen of the United States, residing at Naugatuck, county of New Haven, State of Connecticut, have invented a new and useful Non-Slipping Rubber Tire, of which the following is a specification.

My invention has for its object to provide a non-slipping rubber tire adapted for vehicles generally—as, for example, business and pleasure wagons—but especially adapted for the wheels of the various classes of power-driven vehicles which are generically known as "automobiles."

Heretofore automobiles, whether driven by electricity, steam, compressed air, ammonia-gas, or other sources of mechanical power, have been practically useless in icy weather, especially upon grades, owing to the fact that the wheels would slip to such an extent as to make the vehicles uncontrollable, and the same difficulty has always existed, but to a lesser extent, in connection with business and pleasure wagons.

I am aware that various kinds of traction-wheels provided with spurs have heretofore been used. My invention, however, provides a rubber tire adapted for use upon the wheels of automobiles and other vehicles and which under the circumstances of ordinary use is practically identical with ordinary rubber tires, but which shall be so constructed that the periphery may quickly be provided with spurs that will enable the vehicle to be used upon icy roads or to climb hills, each tire being provided with threaded sockets and interchangeable plugs and spurs being provided which may be shifted in a moment's time without other tools than a wrench and screw-driver and by any person skilled or unskilled, so that a single set of tires costing practically no more than ordinary rubber tires may be made to serve equally well under the conditions of ordinary use or of hill-climbing in icy weather.

With these ends in view I have devised the simple and novel non-slipping rubber tire which I will now describe, referring to the accompanying drawings, forming part of this specification, and using reference characters to designate the several parts.

Figure 1 is an elevation illustrating one of my novel non-slipping rubber tires as applied to a wheel, a portion of the rim and the tire being broken away to show the construction of the sockets and the manner in which they are secured in the tire; Fig. 2, a transverse section, on an enlarged scale, at one of the sockets, showing a spur in position for use; and Fig. 3 is a longitudinal section at one of the sockets.

A denotes a rim or felly, F a metal tire, and B a rubber tire, it being of course obvious that the special configuration or design of the rim, the metal tire, or the rubber tire is not of the essence of my invention.

C denotes internally-threaded sockets which are firmly secured in the rubber tire and open outward. These sockets are retained in place by means of rods 17, which are rigidly anchored in the sockets and are provided with eyes 18, adapted to be threaded upon a longitudinal wire G, said wire and the sockets being firmly embedded in the rubber tire by being molded therein. In order to reduce the strain upon the longitudinal wire and to prevent the possibility of the sockets becoming loosened by being tilted through oblique strain upon the spurs when the latter are used, I provide the sockets with wings or holding-plates 19, which extend longitudinally in the rubber tire and are firmly embedded therein.

20 denotes tire-bolts which may or may not be used to hold the metal tire in place upon the rim or felly. In order to furnish a perfectly secure and inexpensive mode of securing the rubber tire in place upon the metal tire and at the same time enable me to use a light, but very strong, metal tire, I provide the metal tire with a rib 21, having a head or double flange 22, both rib and head being embedded in the rubber tire, as clearly shown in Fig. 2, the special shape of the rib and the head or double flange being of course immaterial, the object being to provide an anchor or suitable holding device about which the material of the rubber tire may be molded while in a plastic condition. In view of the fact that the rib and flange enable me to use a relatively light metal tire and at the same time retain all the strength that can possibly be required I form upon the outer periphery of the metal tire bosses 23, through which the tire-bolts pass, the object being to give greater hold for the thread of the tire-bolts.

D denotes spurs, which may or may not be provided with bases 14, said bases being made angular, as shown in the drawings, or provided with recesses to adapt them to receive a wrench.

15 denotes threaded shanks upon the spurs, which engage the threads of the sockets, the bases, if used, resting in the assembled position closely in engagement with the outer face of the rubber tire, as clearly shown in the drawings.

E denotes threaded plugs, which are adapted to fill the sockets under the conditions of ordinary use—that is, when the spurs are not required. These plugs may or may not be provided with slots 16 to receive a screwdriver for the purpose of turning them in and out.

The use of my novel tire will be too obvious to require description in detail. It is deemed quite sufficient for the purposes of this specification to say that under the conditions of ordinary use plugs E remain in the sockets. In icy weather or when for any reason there is danger of the tire slipping or sliding a portion or all of the plugs may be removed by a screw-driver and the shanks of the spurs turned into the threaded sockets by means of a wrench.

Having thus described my invention, I claim—

1. The combination with a rubber tire, of threaded sockets, rods anchored in said sockets and provided with eyes and a wire upon which the eyes are threaded, said wire, rods and sockets being embedded in the tire.

2. The internally-threaded socket C having wings 19 and rods 17, substantially as shown, for the purpose specified.

3. The combination with a rubber tire, of a series of internally-threaded sockets having wings 19, rods anchored in said sockets and provided with eyes, and a wire upon which the eyes are threaded.

In testimony whereof I affix my signature in presence of two witnesses.

KANUTE ARVID ENLIND.

Witnesses:
JAMES W. BARTON,
S. D. BINGHAM.